United States Patent [19]

Masaki

[11] Patent Number: 4,653,859
[45] Date of Patent: Mar. 31, 1987

[54] LIQUID CRYSTAL OPTICAL MODULATING ELEMENT HAVING PARTICULAR CAPACITANCE BETWEEN LINES AND METHOD FOR DRIVING THE SAME

[75] Inventor: Yuichi Masaki, Kawasaki, Japan

[73] Assignee: Canon Kabushiki Kaisha, Tokyo, Japan

[21] Appl. No.: 582,596

[22] Filed: Feb. 22, 1984

[30] Foreign Application Priority Data

Mar. 4, 1983 [JP] Japan .................... 58-35361
Jul. 27, 1983 [JP] Japan .................... 58-137134

[51] Int. Cl.$^4$ ............................................. G02F 1/13
[52] U.S. Cl. .............................. 350/333; 350/336
[58] Field of Search ............................................. 350/333

[56] References Cited

U.S. PATENT DOCUMENTS

| | | | |
|---|---|---|---|
| 4,146,876 | 3/1979 | Arellano et al. | 350/333 X |
| 4,326,776 | 4/1982 | Banda | 350/333 X |
| 4,508,429 | 4/1985 | Nagae et al. | 350/350 S |
| 4,547,043 | 10/1985 | Penz | 350/333 X |
| 4,548,476 | 10/1985 | Kaneko | 350/350 S |
| 4,560,999 | 12/1985 | Tokuhara | 350/337 X |

FOREIGN PATENT DOCUMENTS 59-78319  5/1984  Japan .................... 350/333

Primary Examiner—John K. Corbin
Assistant Examiner—Richard F. Gallivan
Attorney, Agent, or Firm—Fitzpatrick, Cella, Harper & Scinto

[57] ABSTRACT

An optical modulating element for time division driving having an electrode structure comprising a plural number of signal electrodes and a plural number of line electrodes arranged so as to confront the signal electrodes to form a matrix, and a liquid crystal arranged between said signal electrodes and line electrodes, wherein the electrostatic capacitance between said plural number of line electrodes is made 1000 PF (picofarad) or lower.

11 Claims, 15 Drawing Figures

LIQUID CRYSTAL OPTICAL MODULATING ELEMENT HAVING PARTICULAR CAPACITANCE BETWEEN LINES AND METHOD FOR DRIVING THE SAME

BACKGROUND OF THE INVENTION

1. Field of the Invention

This invention relates to an optical modulating element, particularly a liquid crystal-optical shutter, more particularly to a liquid crystal-optical shutter suitable for time division driving system (dynamic driving system).

2. Description of the Prior Art

A liquid crystal-optical shutter utilizes the electro-optical modulating function of a liquid crystal, and its modulating portions are arranged in an array, irradiated with light and the transmitted light is taken out selectively, whereby light signals corresponding to the electrical image signals are formed, which light signals being then irradiated on an electrophotographic photosensitive member to obtain digital copies.

Such a liquid crystal-optical shutter array includes the following advantages:

1. When used for an electrophotographic printer, the device as a printer can be miniturized;
2. A mechanical driving portion such as a polygon scanner used in LBP (laser beam printer is not required) and the need for severe mechanical precision is small. Such advantages will naturally give rise to possibilities of improvement of reliability, reduction in weight and lower cost. In fact, however, various problems are involved.

FIG. 1 shows an example of the construction of a liquid crystal shutter array which would is easily understood.

As shown in FIG. 1, openings 11 are provided, with other shaded portions being generally applied with masks so that all light may be blocked. A liquid crystal is sealed between the signal electrodes 13 (13a, 13b, 13c, 13d, . . . ) and the common electrode 14 arranged so as to confront the signal electrodes 13. However, such a liquid crystal-optical shutter, in order to be designed as a shutter having a shorter length of A-4 size with a density of the image formed of 10 dot/mm by arranging the openings according to the mode as shown in FIG. 1, requires about 2000 signal electrodes and the number of drivers necessary for driving respective signal electrodes is also 2000.

The number of drivers in a typical IC, when using IC with 50 pins, is 40. Here, cost reduction is limited.

Alternatively, one may also consider dividing the common electrode into plural lines to be placed in matrix correspondence to the signal electrodes, thereby performing shutter opening and closing with time division for respective lines of the common electrode. When such a liquid array is used as the head for electrophotographic copying machine, the line electrode is required to have a length in the longer direction generally of 150 mm or longer, particularly 210 mm or longer so as to be adapted for the A-4 size according to the Japanese Industrial Standard.

However, according to the study by the present inventor, in a liquid crystal shutter array having long line electrodes in a plural number of lines juxtaposed on one sheet of a substrate and also having light-shielding masks having insulating properties arranged between the line electrodes to prevent light from coming through the gaps between the line electrodes, a great electrostatic capacitance is created between the line electrodes, which is found to make the light transmittance during shutter opening as small as a few percent. As a consequence, the contrast between closing and opening of the shutter is small. For this reason, designing of a photosensitive drum or process designing is rendered difficult in the mounting of such a liquid crystal shutter array on a printer head of an electrophotographic copying machine. In particular, a disadvantage has been found that a satisfactory image cannot be formed when a fluorescent lamp of about 30 W is used as the light source.

As another disadvantage, in the time division driving system wherein the common electrode is divided into a plural number of lines, the electrostatic capacitance formed between each line electrode and the signal electrode confronted therewith differs from line to line, thus giving different transmittance at the respective openings of the shutter array to result in digital copies lacking satisfactory quality. This may be considered to be caused for the following reason. That is to say, the portions, other than the openings in the shutter array, are required to be shielded from light, and hence it is generally practiced to have the portions on the common electrode, except for the openings, masked with a metal such as chromium (in this case, the portions between the respective line electrodes are shielded from light with an insulating black coating), with the result that the metal light-shielding mask act as the common electrode to give an electrostatic capacitance between a first common electrode and the signal electrodes which is different in value from that between a second common electrode and the signal electrodes.

SUMMARY OF THE INVENTION

An object of the present invention is to provide an optical modulating element, particularly a liquid crystal-optical shutter, which eliminates the disadvantages as described above.

Another object of the present invention is to provide a liquid crystal-optical shutter which is suited for a time division driving system.

Still another object of the present invention is to provide a liquid crystal-optical shutter which is improved in light transmittance during opening of the shutter.

It is also another object of the present invention to provide a liquid crystal-optical shutter array which is made equal in transmittances at its respective openings.

Further object of the present invention is to provide a liquid crystal-optical shutter array capable of giving digital copies of high image quality.

According to the present invention, there is provided an optical modulating element, having an electrode structure comprising two groups of plural band-shaped electrodes which are confronted with and crossed over each other to form a matrix, being capable of actuating a liquid crystal according to a driving system wherein the voltages are applied with time division for respective lines with one group of the plural band-shaped electrodes as the line electrodes (common electrode), with a metal light-shielding mask being formed on the substrate having such line electrodes formed at the areas excluding the areas for shutter openings, and the electrostatic capacitance between the line electrodes being maintained at 1000 PF (picofarad) or lower.

DETAILED EXPLANATION OF THE EMBODIMENTS OF THE INVENTION

Figure 2:
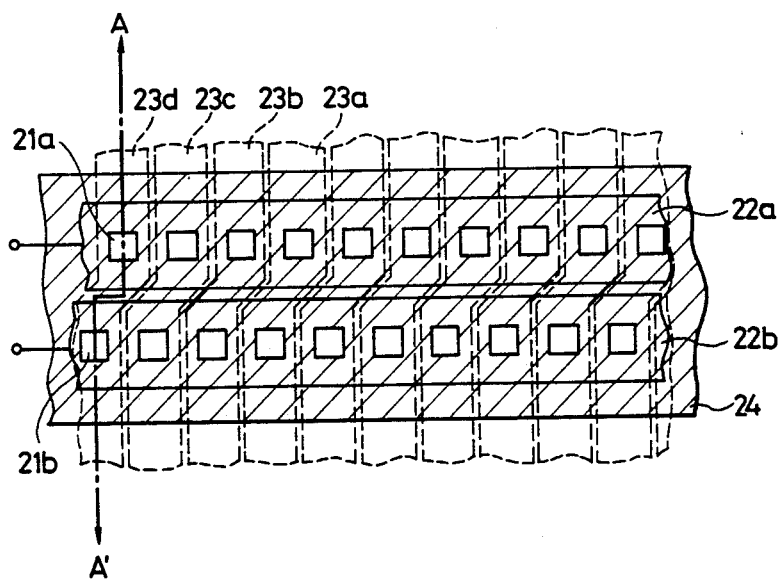
FIG. 2 is a plan view of the liquid crystal-optical shutter of the present invention.
Figure 3:
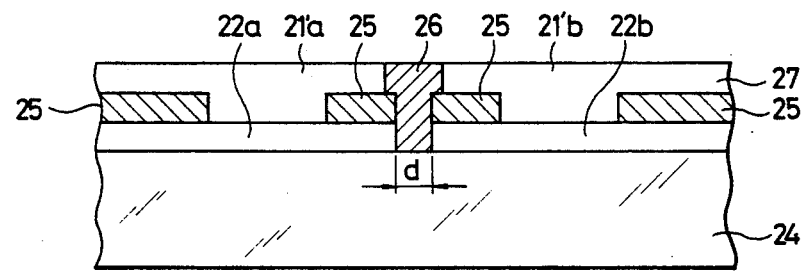
FIG. 3 and FIG. 4 are sectional views of the line electrode substrate taken along A–A' in FIG. 2.
Figure 4:
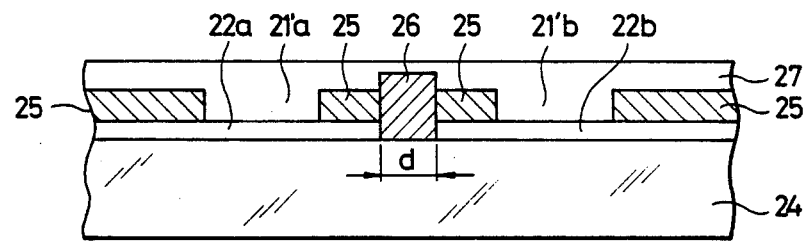

The liquid crystal-optical shutter of the present invention has an embodiment as shown in, for example, FIG. 2 and the line electrode (common electrode) substrate used therein has an embodiment as shown in FIGS. 3 and 4.

The shutter shown in FIG. 2 has a plural number of shutter openings 21 (21a, 21b, . . . ) in staggered form, each being positioned at the crossing portion between the line electrodes 22a and 22b and the signal electrodes 23 (23a, 23b, 23c, 23d, . . . ). The line electrode substrate used for this shutter has a metal light-shielding mask 25 formed on the substrate 24 (glass, plastic, etc.) at the area excluding the areas 21' (21'a, 21'b) for forming the shutter openings 21, on which are arranged through the intermediary insulating film 26 the line electrodes 22a and 22b. This embodiment is clarified in FIG. 3.

In FIG. 3, the line electrode substrate used for this shutter has a metal light-shielding mask 25 formed on the substrate 24 (glass, plastic, etc.) on the line electrodes 22a and 22b at the area excluding the areas 21' (21'a, 21'b) for forming the shutter openings 21. Further, between the line electrodes 22a and 22b, there is arranged a light-shielding mask 26 having insulating property. In the Figure, an insulating film 27 is illustrated and comprises a resin or other materials.

Now, an example of the step for forming the line electrode as shown in FIG. 3 is to be explained. In FIG. 3, line electrodes 22a and 22b comprising transparent electroconductive thin films and the metal light-shielding mask 25 are to be formed on glass substrate 24, and a polyvinyl alcohol (PVA) film is formed as the aligned film thereon. As PVA, an aqueous 10% solution of Gosenol EG-05 (produced by Nippon Gosei Kagaku Kogyo) mixed with ammonium dichromate as photosensitivity imparting agent in an amount of 5% based on the solid of the above PVA is applied by rotary coating (6000 rpm, 10"), followed by heating at 60° C. for 15 minutes, to form the insulating film 27.

Next, under the state where the peripheral portion is covered with a mask, the PVA film (insulating film 27) is exposed to light for 10 to 15 seconds and developed with pure water for 30 minutes to remove the unexposed portion. Subsequently, after drying by blowing with $N_2$ gas and then drying by heating at 80° C. for 5 minutes, the surface of the PVA film is subjected to aligning treatment by rubbing.

As the next step, a photoresist (FPPR #800) is applied by rotary coating (2000 rpm, 10"), followed by heating at 80° C. for 5 minutes to form a photoresist layer, and then with a mask covering the area 26 in the Figure, the photoresist layer is exposed to light for 7 seconds and developed with a developer to remove the photoresist layer at the area 26 in the Figure.

Subsequently, the PVA film is stained by dipping in a dye solution for 5 minutes to form a light-shielding mask 26 having insulating properties. Any of Sumifix Black ENS (Sumitomo Kagaku), Solophenyl INGL (Ciba-Geigy) or Cibacet Grey NH (Ciba-Geigy) dissolved in 2% aqueous solution of $NH_4OH$ may be employed as the dye. Alternatively, the film may be dipped successively in two or three kinds of dyes to obtain a desired density. As the next step, after rinsing with pure water, the remainder of the photoresist layer is removed with methyl ethyl ketone, followed by the finishing steps such as rinsing with isopropyl alcohol, vapor drying with carbon tetrafluoride and baking (180° C., 15'), to complete the light-shielding mask 26 with the gap portion between the line electrodes 22a and 22b opaquely stained.

Another example of the step for forming the line electrode as shown in FIG. 4 is explained below. In FIG. 4, line electrodes 22a and 22b comprising transparent electroconductive thin films and the metal light-shielding mask are to be formed, on glass substrate 24 and a polyvinyl alcohol (PVA) film is formed thereon. As PVA, an aqueous 10% solution of Gosenol EG-05 (produced by Nippon Gosei Kagaku Kogyo) mixed with ammonium dichromate as photosensitivity imparting agent in an amount of 5% based on the solid of the above PVA is applied by rotary coating (6000 rpm, 10"), followed by heating at 60° C. for 15 minutes.

Next, a mask is aligned so that only the gap portion of the metal light-shielding mask 25 may be irradiated with light. The PVA film is exposed to light for 10 to 15 seconds and developed with pure water for 30 minutes to remove the unexposed portion. Then, after drying by blowing with $N_2$ gas, the film is dried by heating at 80° C. for 5 minutes.

Subsequently, the PVA film is stained by dipping in a dye solution for 5 minutes. Any of Sumifix Black ENS (Sumitomo Kagaku), Solophenyl INGL (Ciba-Geigy) or Cibacet Grey NH (Ciba-Geigy) dissolved in 2% aqueous solution of $NH_4OH$ may be employed as the dye. Alternatively, the film may be dipped successively in two or three kinds of dyes to obtain a desired density. By this operation, a light-shielding mask 26 having insulating properties is formed.

Then, after rinsing with pure water, following the finishing steps such as rinsing with isopropyl alcohol, vapor drying with carbon tetrafluoride and baking (180° C., 15'), the light-shielding mask 26 is completed with the gap portion opaquely stained.

And, after its surface is coated with a 2.5% solution for forming a polyimide resin (SP-510, produced by Toray Co.) which is a polyamic acid in N-methylpyridine by rotary coating (3000 rpm, 60 sec.), the film is heated at 300° C. for 30 minutes to form a polyimide insulating film 27.

After sealing and removal of the polyimide film at the electrode terminal portions (by etching at a temperature of 60° C. for 10 minutes with the use of a 10% alkali aqueous solution), the aligning direction of the liquid crystal molecules is determined by rubbing.

The metal light-shielding mask 25 can be formed generally by employment of photolithographic steps after formation of a coated film of a reflective metal such as chromium, aluminum or silver by way of vapor deposition or plating. Such a metal light-shielding mask 25 may be formed to a film thickness of 300 to 2000 Å, when it is formed of chromium. On the other hand, the insulating film 27 may be obtained by forming a coated film of an insulating material such as $SiO_2$ or polyimide to a sufficient film thickness for imparting insulating property (about 0.5 to $3.0\mu$) according to vapor deposition, sputtering or coating. The line electrodes 22 and the signal electrodes 23 can be formed of transparent electroconductive materials such as indium oxide, tin oxide and alloys thereof. On the line electrodes 22 and the signal electrodes 23, it is possible to arrange an alignment-controlling coated film such as of $SiO_2$, polyimide or poly-p-xylylene, and, when treatment such as rubbing is applied on the alignment-controlling coated film, the liquid crystal can be aligned along the rubbing direction.

Figure 5:
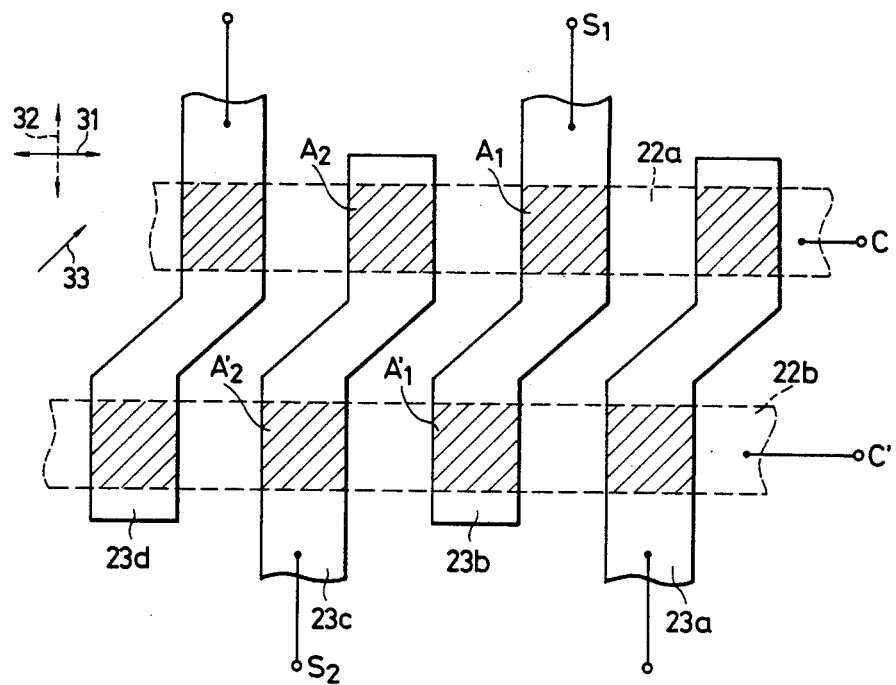
FIG. 5 is a plan view of the line electrode and the signal electrode of the present invention.

FIG. 5 is a plan view showing a part of the liquid crystal-optical shutter array of the present invention.

According to an embodiment of the present invention, the liquid crystal-optical shutter array having an electrode structure for $\frac{1}{2}$ time division driving as shown in FIG. 5 may be employed. In the array shown in FIG. 5, on the first substrate are arranged two lines of line electrodes $22a$ and $22b$ (shown in broken lines in the Figure) and on the second substrate confronting these electrodes are arranged signal electrodes 23 ($23a$, $23b$, $23c$, $23d$, . . . ) crossing over the two lines of line electrodes $22a$ and $22b$. The respective crossing portions between the line electrodes $22a$ and $22b$ and the signal electrodes 23 are shown by slanted lines. These crossing portions, arranged in staggered, form can be expressed interchangeably as the openings for the liquid crystal-optical shutter array, and hence hereinafter referred to as openings.

Such a liquid crystal-optical shutter array has polarizing plates outside of the first substrate and the second substrate, respectively, and is under the state of crossed Nicols as shown by the arrows 31 and 32. The inner wall surfaces of the first substrate and the second substrate have a homogeneous aligning treatment, such as by rubbing treatment applied so that the P-type liquid crystal sandwiched therebetween may be initially aligned in the direction of the arrow 33 (at an angle of approximately 45° relative to the polarizing direction of the polarizing plate).

For brevity of the following explanation, attention is called particularly on the openings $A_1$ and $A_2$ corresponding to the line electrode $22a$ and the openings $A_1'$ and $A_2'$ corresponding to the line electrode $22b$ and explanation is made by taking examples of the actuations at these openings $A_1$, $A_2$, $A_1'$ and $A_2'$.

Figure 6:
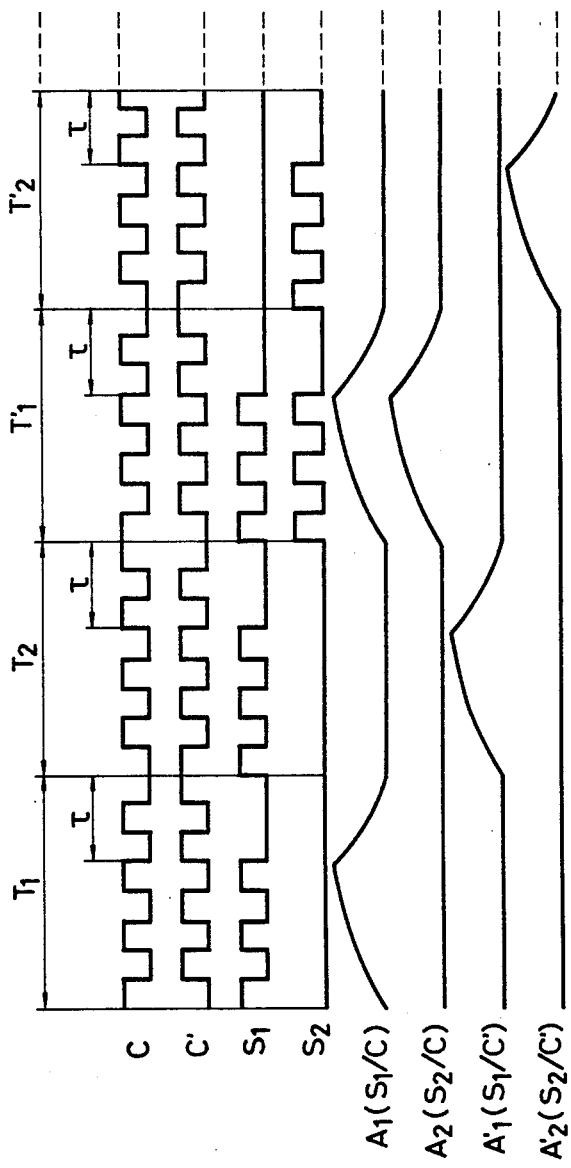
FIG. 6 is a schematic illustration showing the time chart when the liquid crystal-optical shutter of the present invention is actuated.
Figure 7A:
FIGS. 7(a), 7(b), 7(c) and 7(d) are schematic illustrations showing transmittances at the shutter openings when the liquid crystal-optical shutter of the present invention is actuated.
Figure 7B:
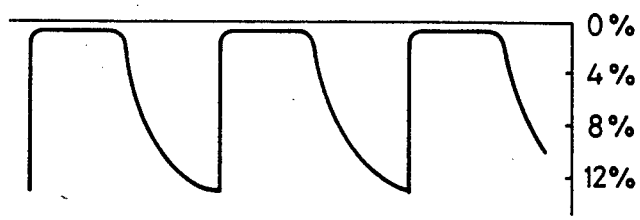
Figure 7C:
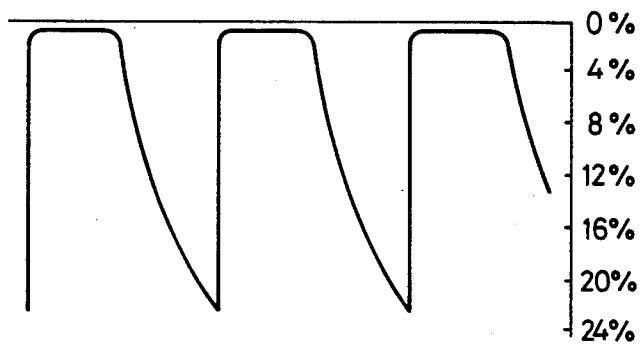
Figure 7D:
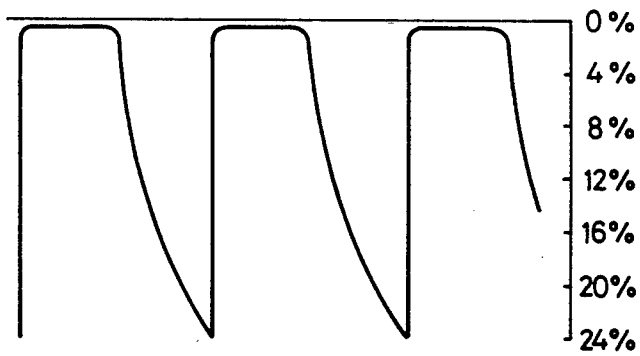

FIG. 6 shows a time chart to be used in the driving method of the present invention. The times $T_1$, $T_1'$, $T_1''$ . . . are times at which the openings corresponding to the line electrode $22a$ are actuated, and actuations of all the openings corresponding to the line electrode $22b$ are stopped. The times $T_2$, $T_2'$, $T_2''$ . . . are times at which the openings corresponding to the line electrode $22b$ are actuated, and actuations of all the openings corresponding to the line electrode $22a$ are stopped. In other words, at the times $T_1$, $T_1'$, $T_1''$ . . . actuations of the openings $A_1'$ and $A_2'$ must not be affected by the signals $S_1$ and $S_2$ applied on the signal electrodes $23b$ and $23c$, while at the times $T_2$, $T_2'$, $T_2''$ . . . actuations of the openings $A_1$ and $A_2$ must not be affected by the signals $S_1$ and $S_2$.

First, actuations at respective openings at the times $T_1$, $T_1'$, $T_1''$ . . . are to be explained. As shown in the time chart in FIG. 6, voltages C and C' are applied on the line electrodes $22a$ and $22b$, respectively. The voltage C is in opposite phase to the voltage C'. On the other hand, whether the shutter is turned on or off can be determined by applying to the signal electrodes $23b$ and $23c$ a voltage of the same phase as the voltage C applied on the line electrode $22a$ to be addressed or maintaining a constant level of voltage thereon.

At the time $T_1$ illustrated in FIG. 6, an example wherein only the opening $A_1$ is under the state of shutter-on (the state permitting transmission of irradiated light is shown). However, in this example, a time $\tau$ for urging the off-state at the end portion of the time for addressing one line is provided of necessity. To explain about the fact that the line openings $A_1'$ and $A_2'$ corresponding to the line electrode $22b$ are under the state of shutter-off (the state shielding irradiated light) at the time $T_1$, the actuation of the liquid crystal at $A_1'$ is determined by the electrical field by the voltage C' and the signal $S_1$. Since C' and $S_1$ are voltage signals opposite in phase to each other, the liquid crystal layer at $A_1$, is subjected to strong electrical field to prevent transmission of light (off-state) as explained previously in the example of the prior art. On the other hand, $A_2'$ is determined by C' and $S_2$. Since $S_2$ is maintained at a constant level of voltage, also a relatively strong electrical field is applied on the liquid crystal layer at $A_2'$ by the voltage C', whereby $A_2'$ becomes in the off-state. On the other hand, $A_2$, which is determined by the signal $S_2$ and the voltage C, is in the off-state, since a relatively strong electrical field acts on the liquid crystal layer by the voltage C because $S_2$ is a constant signal level. Whereas, at $A_1$, which is determined by C and $S_1$, a voltage with an absolute value of $|C-S_1|$ is applied on the liquid crystal layer at $A_1$ because $S_1$ is a voltage signal of the same phase as C. Since this value is zero or brings about a relatively weak electrical field, there is created a state permitting transmission of light (on-state).

Similarly, at the time $T_1'$ when the line formed by the line electrode $22a$ is addressed, there is shown an example wherein both $A_1$ and $A_2$ are brought while $A_1'$ and $A_2'$ are in the off-state by relatively strong electrical fields determined by $S_1$, $S_2$ and C', respectively. To summarize the above description, at the time when addressing the line formed by the line electrode $22a$, the line openings on the line formed by the line electrode $22b$ is surely in the off-state regardless of the states taken by the signals $S_1$ and $S_2$.

Next, explanation is made about the times $T_2$, $T_2'$, $T_2''$ . . . , when addressing the line formed by the line electrode 22b. An example wherein only $A_1'$ is in the on-state at the time $T_2$ and only $A_2'$ is in the on-state at $T_2'$ is shown. At $T_2, T_2', T_2'' \ldots$, the voltage $C'$ is opposite in phase to C. On the other hand, whether the shutter is turned on or off is determined by applying signal voltages $S_1$ and $S_2$ of the same phase as $C'$ or maintaining a constant voltage level. In the liquid crystal layer at the openings $A_1$ and $A_2$, the is maintained since relatively strong electrical field acts constantly as explained previously for $A_1'$ and $A_2'$ in the time $T_1, T_1', T_1'' \ldots$. Whereas, for $A_1'$ and $A_2'$ in the times $T_2, T_2', T_2'' \ldots$, either the on- or off-state can be selected depending on $S_1$ and $S_2$ as explained previously for $A_1$ and $A_2$ in the times $T_1, T_1', T_1'' \ldots$.

The time $\tau$ provided at the end portion of the respective times $T_1, T_2, T_1', T_2', T_1'', T_2'' \ldots$ are all provided for the purpose of making the openings equally in the off-state, which was effected by making the signals $S_1$ and $S_2$ at voltages of a constant level. By inputting of this extinguishing signal, light transmission can surely be shielded at the opening which should be in the off-state in the next stage.

During the actuation mode utilizing retardation of the liquid crystal as described above, in order to make the shutter opening 21 selected in an opened (on) state while maintaining a voltage constantly applied between the line electrode 22 and the signal electrode 23 to maintain a shielded (off) state, actuation can be effected by changing the aligning mode of the liquid crystal by applying a low voltage or zero voltage or a threshold value or lower by synchronizing the signal electrode 23 selected with the line electrode 22 (in other words, for obtaining the shutter-opened state as shown in FIG. 5, the signal electrode is applied with a voltage wave form at the same phase and at the same level as the voltage wave form which is applied on the line electrode, as synchronized with the line electrode, whereby the shutter-opened state can be obtained). However, as described above, since capacitance combination occurs between the line electrodes on the line electrode substrate side and hence surplus voltage is applied on the liuqid crystal on actuation of the opened state, with the result that no sufficient light transmittance can be obtained under opened state.

Besides, since such an electrostatic capacitance is determined by $C = \epsilon \cdot S/d$ (where C is electrostatic capacitance, $\epsilon$ is specific dielectric constant, S is area of the confronting portion between the electrodes and d is distance between the line electrodes), the liquid crystal-optical shutter is required to have a length corresponding to the shorter length of A-4 size or A-3 size according to the Japanese Industrial Standard in order to be applied for a head of an electrophotographic printer, whereby "S" in the above formula will be increased correspondingly in this kind of shutter. For this reason, in a long liquid crystal-optical shutter array, because no sufficient transmitted light quantity can be obtained during shutter opening, the intensity of the light source is required to be increased or alternatively the printer is required to be operated at a low speed by rotating the photosensitive drum at a relatively low speed.

According to a preferred embodiment of the present invention, the aforesaid electrostatic capacitance can be set at 1,000 PF (picofarad) or lower, preferably 500 PF or lower, particularly preferably 250 PF or lower.

FIGS. 7(a)–7(d) show transmittances when the shutter openings were placed in the on-state by applying the voltages having the driving wave forms as shown in FIG. 6 on the liquid crystal-optical shutters using the line electrode substrates having electrostatic capacitances of 1000 PF, 470 PF, 220 PF and 0 PF, respectively.

According to FIGS. 7(a)–7(d), it can be seen that transmittance on shutter opening is about 5% when the electrostatic capacitance of the line electrode is made 1000 PF, about 13% at 470 PF, about 22% at 220 PF and about 24% at 0 PF when use of the light-shielding mask 26 having insulating properties is omitted.

Figure 8:
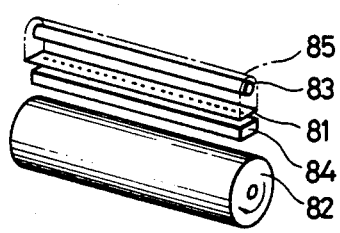
FIG. 8 is a schematic perspective view of the printer head in which the liquid crystal-optical shutter of the present invention is employed.

As described above, gaps are formed between the line electrodes in a liquid crystal-optical shutter employing the time division driving system and light from such gaps will be irradiated on the photosensitive drum provided on the printer head as shown in FIG. 8, whereby erroneous actuations or formation of unnecessary images may occur. For this reason, a light-shielding mask is required to be used.

The intervals between the line electrodes and the length of the longer direction can be determined so that the electrostatic capacitance formed between the line electrodes may be set at 1000 PF or less, preferably 500 PF or less, particularly preferably 250 PF or less, in consideration of the transmittance on shutter opening. In particular, when using line electrodes having a length in the longer direction of 150 mm or longer, particularly a length of 210 mm or longer so as to be consistent with the shorter length of A-4 size, the interval between the line electrodes can be held at a distance of 15 μm to 100 μm, preferably 20 μm to 50 μm, particularly preferably 25 μm to 40 μm.

As a comparative experiment, a liquid crystal-optical shutter was prepared by use of a line electrode substrate having two lines of line electrodes of which length in the longer direction is set at 210 mm and between which interval is held at a distance of 10 μm, and actuated by application of the voltages with the driving wave forms as shown in FIG. 6. As the result, the electrostatic capacitance between the line electrodes was found to become 1000 PF or higher, with the light transmittance on shutter opening being about 2%.

In contrast, in the present invention, when the interval between the line electrodes was set at 30 μm, the electrostatic capacitance between the line electrodes could be made 500 PF or less, with the light transmittance on shutter opening being about 15%.

FIG. 8 shows a schematic constitution for giving optical signals to a photosensitive member by using a liquid crystal shutter array, in which the charger or other members are omitted. 81 is a liquid crystal-optical shutter array, 82 is a photosensitive drum, 83 is a light source (e.g. fluorescent lamp), 84 is a selfoc lens array and 85 is a condensing cover. As described previously, when a liquid crystal-optical array is used, the printer can be assembled in a more compact form as compared with LBP of the prior art.

According to a preferred embodiment of the present invention, in effecting optical modulation by use of a liquid crystal-optical shutter array comprising a first substrate having plural lines of common electrodes and a second substrate having signal electrodes confronted with and crossed over the aforesaid plural lines of common electrodes through an intermediary liquid crystal sealed therebetween, driving can be performed with time division for respective lines corresponding to common electrodes thereby to make the electrostatic capacitances formed between the aforesaid plural line electrodes (common electrodes) and the signal electrodes confronted therewith equal or approximately equal.

In this system, addressing is made by applying a voltage on the signal electrodes of the same phase as the common electrodes to remove electrical field between the upper and lower sides, thereby effecting address with transmittance of light.

Figure 9:
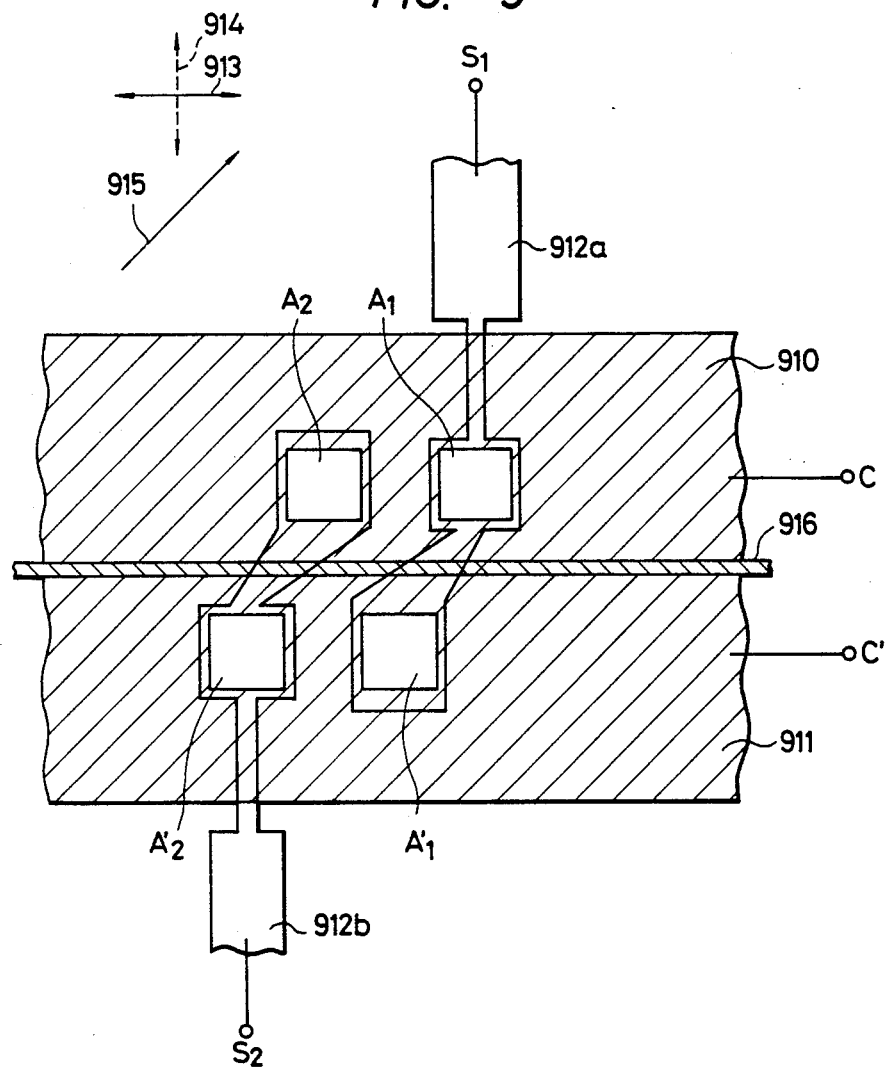
FIG. 9 is a plan view of the electrode structure used in the electro-optical modulating element of the present invention.

FIG. 9 is a plan view showing a part of the liquid crystal-optical shutter array of the present invention.

According to a preferred embodiment of the present invention, a liquid crystal-optical shutter array having an electrode structure for ½ time division driving as shown in FIG. 9 may be used. The array shown in FIG. 9 has two lines of common electrodes 910 and 911 arranged on a first substrate and signal electrodes 912 (912a, 912b, 912c, 912d, ...) crossing over the two lines of common electrodes 910 and 911 arranged on a second substrate confronted with the first substrate. The crossing portions are arranged in a staggered form between the common electrodes 910 and 911 and the signal electrodes 912 (912a, 912b, 912c, 912d, ...) can be expressed interchangeably as openings for a liquid crystal-optical shutter array, and hence referred to hereinafter as openings. The portions other than such openings are applied with a metal light-shielding mask such as of chromium (shown by slanted lines) on the common electrodes for blocking all light. Also, similar light-shielding can be effected with an insulating material 916 (polyvinyl alcohol film stained in black) between the light-shielding masks (between the common electrodes 910 and 911).

Such a liquid crystal-optical shutter array has polarizing plates outside of the first substrate and the second substrate, respectively, and is under the state of crossed Nicols as shown by the arrows 913 and 914. The inner wall surfaces of the first substrate and the second substrate are applied with homogeneous aligning treatment such as by rubbing treatment so that a nematic type liquid crystal having positive dielectric anisotropy sandwiched therebetween may be initially aligned in the direction of the arrow 915 (at an angle of approximately 45° relative to the polarizing direction of the polarizing plate).

Figure 1:
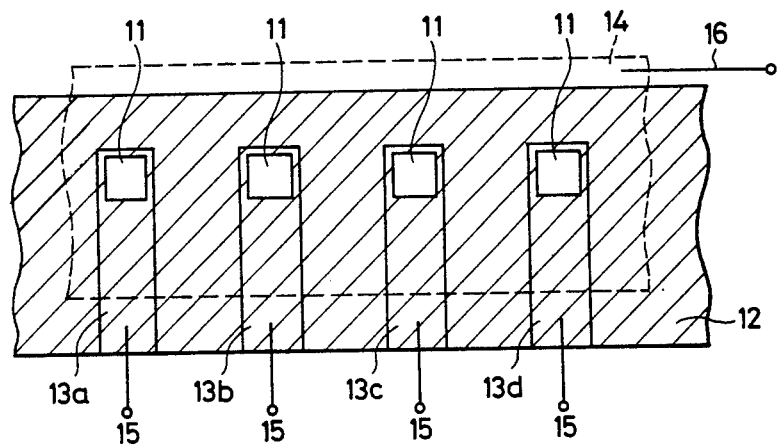
FIG. 1 is a plan view of the liquid crystal-optical shutter of the prior art.
Figure 10:
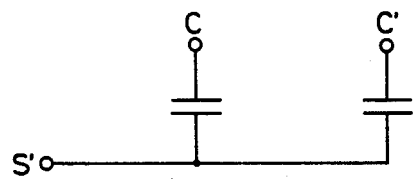
FIG. 10 shows the equivalent circuit in the common electrode and the signal electrode.
Figure 11:
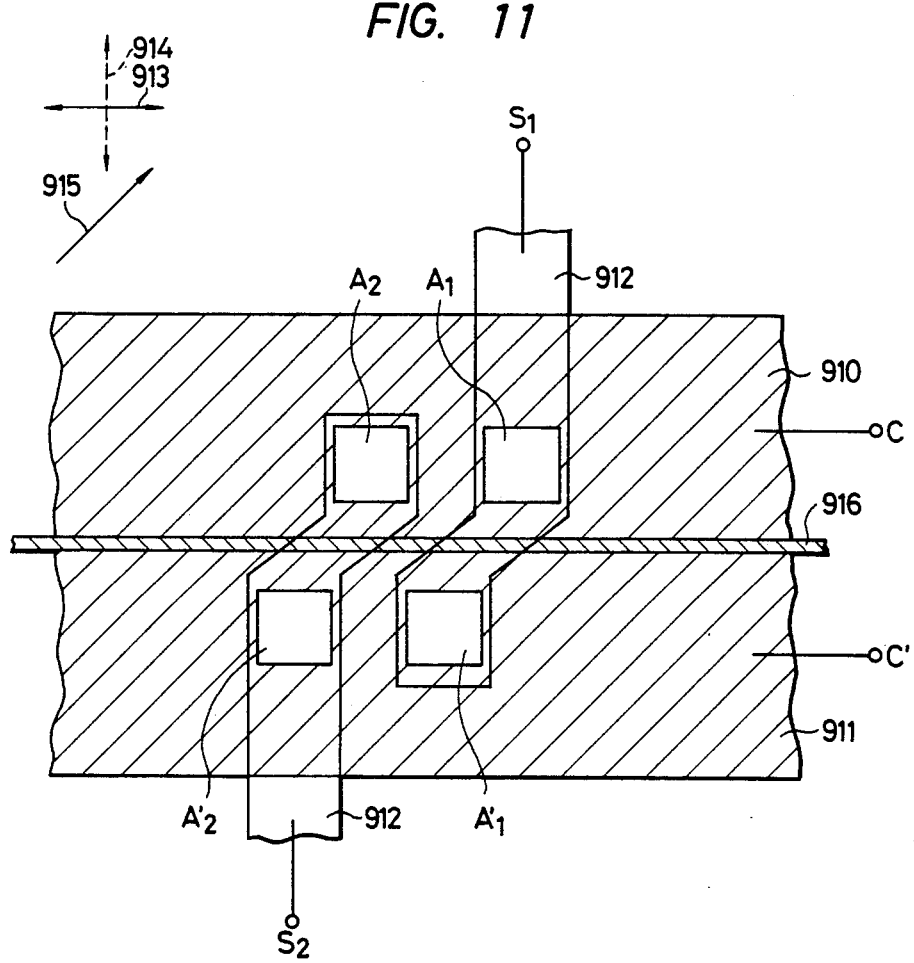
FIG. 11 is a plan view of the electrode structure used in the electro-optical modulating element of the prior art.

The electrostatic capacitance generated between the upper and lower electrodes is determined by the confronting area. Since the metal light-shielding mask used in the liquid crystal-optical shutter array of the prior art as shown in FIG. 1 also acts as the common electrode, the electrostatic capacitances generated between one signal electrode and C and between the same signal electrode and C' will be different from each other. FIG. 10 shows an equivalent circuit as the liquid crystal-optical shutter array. Such a difference in capacitance creates a difference in time constant to affect driving wave forms, whereby the electrical field between the same phase voltages during addressing cannot completely be reduced zero to result in reduction of transmitted light quantity corresponding thereto. As the experimental values, the electrostatic capacitance between $S_1$ and C is 20 PF (picofarad) and that between $S_1$ and C' is 8 PF, and the difference in transmitted light quantity during addressing $A_1$ and $A_1'$ being greater by about 5 to 10% for $A_1'$.

In contrast, in the liquid crystal-optical shutter array of the present invention, having the shape of the signal electrodes 912 as shown in FIG. 9, the confronting area between the signal electrode 912 and the first common electrode 910 can be made approximately 0.03 mm², while that between the signal electrode 912 and the second common electrode 911 similarly approximately 0.03 mm², and therefore the electrostatic capacitances formed between respective confronting surfaces can be made substantially equal.

In the present invention, for the purpose of obtaining a sufficient quantity of transmitted light at the openings in the on-state, it is preferable to set the electrostatic capacitance formed between the signal electrode and the common electrode at 10 PF or lower. If the electrostatic capacitance is greater than 10 PF, even when employed in the head portion of the electrophotographic system printer as shown in FIG. 12, no sufficient electrostatic latent image can be obtained on the photosensitive drum, thus failing to give a digital copy of high quality.

The liquid crystal element shown in FIG. 9 can be driven according to the time chart shown in FIG. 6.

Figure 12:
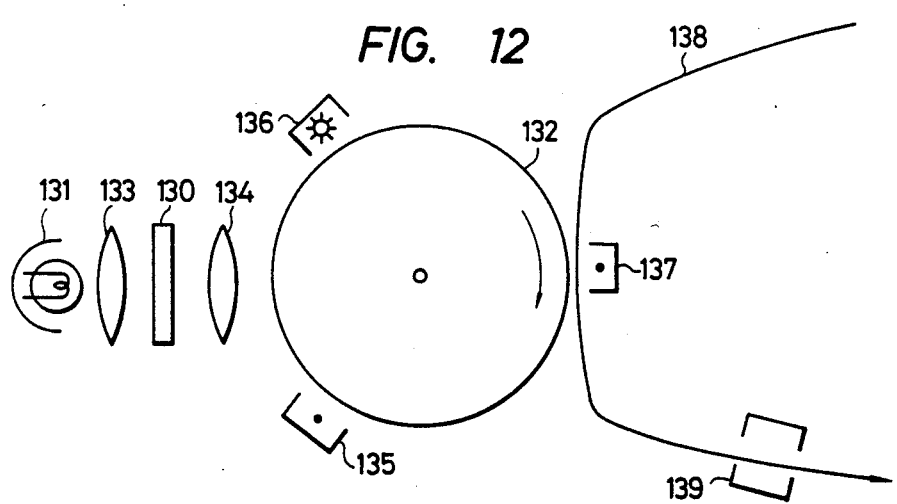
FIG. 12 is a schematic illustration showing the mode of the optical modulating element of the present invention used for the electrophotographic system printer.

FIG. 12 is an illustration for explanation of an embodiment in which the shutter array 130 of the present invention is utilized for an electrophotographic system printer. In FIG. 12, the light source 131 is constantly turned on to irradiate constantly the liquid crystal-optical shutter array 130. The shutter array 130 is shielded from the light from the light source 131 by a liquid crystal driving circuit (not shown) and generates optical signals by making the selected area light-transmissive state, thus enabling control of the light rays irradiated on the photosensitive drum 132. It is also desirable to arrange lenses 133 and 134 in the optical pathway for obtaining condensing performance of the light rays from the light source 131 and optical signals from the shutter array 130. The photosensitive drum 132 is previously charged prior to irradiation of optical signals to plus or minus at the charging station 135 equipped with a corona discharger, etc. and electrostatic latent images are formed at the site irradiated with light on the photosensitive drum 132 with extinction of the charges previously charged. The electrostatic latent images thus formed are developed by applying a developing bias in the presence of a developer comprising a toner of the opposite polarity to that during charging, or the same polarity in the case of reversal development, and a carrier, then transferred onto an image holding member 138 (e.g. paper) at the transferring section 137 and subsequently fixed by heat or pressure at the fixing section 139 to give a completely fixed printed product.

The photosensitive member receiving the optical signals generated from the shutter array 130 is not limited to the electrophotographic system as described above but it may also be a photosensitive member of a silver salt photographic system (e.g. monochromatic paper, color paper, "Dry silver" produced by 3M Co., U.S.A.).

I claim:

1. An optical modulating element for time division driving comprising an electrode structure having a plural number of signal electrodes and a plural number of line electrodes arranged so as to confront the signal electrodes to form a matrix and a liquid crystal disposed between said signal electrodes and line electrodes, wherein the electrostatic capacitance between said plural number of line electrodes is made 1000 PF (picofarad) or lower, and the intervals between the plural number of line electrodes are maintained at a distance of 20 micrometers to 50 micrometers.

2. An optical modulating element according to claim 1, wherein the plural number of line electrodes have a length of 150 mm or longer in the longer direction.

3. An optical modulating element according to claim 2, wherein the intervals between the plural number of line electrodes are maintained at a distance of 25 μm to 40 μm.

4. An optical modulating element for time division driving comprising an electrode structure having a plural number of signal electrodes and a plural number of line electrodes arranged so as to confront the signal electrodes to form a matrix, a substrate supporting at least the line electrodes, and a liquid crystal disposed between said signal electrodes and line electrodes, wherein the electrostatic capacitance between said plural number of line electrodes is made 1000 PF (picofarad) or lower, and the substrate supporting the plural number of line electrodes has a metal light-shielding mask arranged at least on the areas excluding the areas for shutter openings.

5. An optical modulating element for time division driving according to claim 4, wherein said metal light-shielding mask is formed of a film of a reflective metal.

6. An optical modulating element for time division driving according to claim 5, wherein said reflective metal is chromium, aluminum, or silver.

7. An optical modulating element for time division driving comprising an electrode structure having a plural number of signal electrodes and a plural number of line electrodes arranged so as to confront the signal electrodes to form a matrix and a liquid crystal disposed between said signal electrodes and line electrodes, wherein the electrostatic capacitance between said plural number of line electrodes is made 1000 PF (picofarad) or lower, and light-shielding masks having insulating properties are arranged between said plural number of line electrodes.

8. An optical modulating element for time division driving comprising an electrode structure having a plural number of signal electrodes and a plural number of line electrodes arranged so as to confront the signal electrodes to form a matrix, and a liquid crystal disposed between said signal electrodes and line electrodes, wherein the electrostatic capacitance formed between the signal electrode and the line electrode confronted therewith is made 10 PF (picofarad) or lower and the electrostatic capacitances formed between the plural number of line electrodes and the signal electrodes confronted therewith are made equal or approximately equal.

9. A method for driving an optical modulating element for time division driving comprising an electrode structure having a plural number of signal electrodes and a plural number of line electrodes arranged so as to confront the signal electrodes to form a matrix, and a liquid crystal disposed between said signal electrodes and line electrodes, wherein the electrostatic capacitance formed between the signal electrode and the line electrodes confronted therewith is made 10 PF (picofarad) or lower, the electrostatic capacitances formed between the plural number of line electrodes and the signal electrodes confronted therewith are made equal or approximately equal, and a voltage is applied on the electrode of the line to be addressed among the plural number of line electrodes, which voltage being of the opposite phase to that of the electrodes of other lines.

10. A method for driving an optical modulating element for time division driving according to claim 9, wherein a voltage of the same phase as that to be applied on the line electrode to be addressed is applied on the selected signal electrode among the plural number of signal electrodes.

11. A method for driving an optical modulating element for time division driving according to claim 9, wherein there is the period of time for applying an off signal within the period of time for the addressing.

* * * * *